US008131955B2

(12) United States Patent  (10) Patent No.: US 8,131,955 B2
Dussud  (45) Date of Patent: Mar. 6, 2012

(54) EPHEMERAL GARBAGE COLLECTION USING A TRACKING MECHANISM ON A CARD TABLE TO DETERMINE MARKED BUNDLES

(75) Inventor: Patrick H. Dussud, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 10/824,751

(22) Filed: Apr. 15, 2004

(65) Prior Publication Data
US 2005/0235120 A1 Oct. 20, 2005

(51) Int. Cl.
G06F 12/00 (2006.01)

(52) U.S. Cl. ........ 711/159; 711/154; 711/173; 707/813; 707/819

(58) Field of Classification Search .................. 711/159, 711/154, 173; 707/813, 819
See application file for complete search history.

(56) References Cited

U.S. PATENT DOCUMENTS

| | | |
|---|---|---|
| 4,296,476 A | 10/1981 | Mayer et al. |
| 4,432,067 A | 2/1984 | Nielsen |
| 4,905,280 A | 2/1990 | Wiedemer |
| 4,989,134 A | 1/1991 | Shaw |
| 5,237,673 A | 8/1993 | Orbits et al. |
| 5,382,983 A | 1/1995 | Kwoh et al. |
| 5,459,487 A | 10/1995 | Bouton |
| 5,550,575 A | 8/1996 | West et al. |
| 5,551,701 A | 9/1996 | Bouton et al. |
| 5,558,339 A | 9/1996 | Perlman |
| 5,592,651 A | 1/1997 | Rackman |
| 5,598,276 A | 1/1997 | Cookson et al. |
| 5,634,849 A | 6/1997 | Abecassis |
| 5,649,862 A | 7/1997 | Sakaguchi et al. |
| 5,716,273 A | 2/1998 | Yuen |
| 5,752,883 A | 5/1998 | Butcher et al. |
| 5,791,992 A | 8/1998 | Crump et al. |
| 5,842,016 A | 11/1998 | Toutonghi et al. |
| 5,845,298 A | 12/1998 | O'Connor et al. |

(Continued)

FOREIGN PATENT DOCUMENTS

DE 100 46 437 A1 4/2002

(Continued)

OTHER PUBLICATIONS

Sobalvarro, Patrick G., "A Lifetime-based Garbage Collector for LISP Systems on General-Purpose Computers", Sep. 1988, pp. 1-59.*

(Continued)

*Primary Examiner* — Arpan P. Savla
(74) *Attorney, Agent, or Firm* — Lee & Hayes, PLLC

(57) ABSTRACT

The techniques and mechanisms described herein are directed to a system for performing garbage collection on a large heap that is divided into several cards which are grouped into bundles. The techniques include initiating a write-watch mechanism to track accesses to a card table that identifies marked cards. The write-watch mechanism provides a list of the written card table locations to a garbage collection process which determines marked bundles based on the list. For each marked bundle, the marked cards within the marked bundle are scanned to identify the accessed objects. The accessed objects are then collected. Because determining the marked bundles is performed at the start of the garbage collection process and not whenever the memory locations within the bundle are accessed, the present technique reduces the overhead associated with bundle marking and allows the efficiency of the garbage collection process to be less dependent on heap size.

24 Claims, 6 Drawing Sheets

U.S. PATENT DOCUMENTS

| | | | |
|---|---|---|---|
| 5,848,423 A | 12/1998 | Ebrahim et al. | |
| 5,857,210 A | 1/1999 | Tremblay et al. | |
| 5,873,104 A | 2/1999 | Tremblay et al. | |
| 5,873,105 A | 2/1999 | Tremblay et al. | |
| 5,876,286 A | 3/1999 | Lee | |
| 5,878,134 A | 3/1999 | Handelman et al. | |
| 5,896,125 A | 4/1999 | Niedzwiecki | |
| 5,900,001 A | 5/1999 | Wolczko et al. | |
| 5,903,899 A | 5/1999 | Steele, Jr. | |
| 5,903,900 A | 5/1999 | Knippel et al. | |
| 5,909,579 A | 6/1999 | Agesen et al. | |
| 5,911,144 A | 6/1999 | Schwartz et al. | |
| 5,915,255 A | 6/1999 | Schwartz et al. | |
| 5,917,256 A | 6/1999 | Broadbent, II | |
| 5,920,876 A * | 7/1999 | Ungar et al. | 707/206 |
| 5,930,807 A | 7/1999 | Ebrahim et al. | |
| 5,953,736 A | 9/1999 | O'Connor et al. | |
| 5,969,283 A | 10/1999 | Looney et al. | |
| 5,973,683 A | 10/1999 | Cragun et al. | |
| 5,978,920 A | 11/1999 | Lee | |
| 5,993,319 A | 11/1999 | Aoyama | |
| 6,001,015 A | 12/1999 | Nishiumi et al. | |
| 6,009,433 A | 12/1999 | Kurano et al. | |
| 6,025,869 A | 2/2000 | Stas et al. | |
| 6,049,810 A | 4/2000 | Schwartz et al. | |
| 6,065,020 A | 5/2000 | Dussud | |
| 6,115,079 A | 9/2000 | McRae | |
| 6,115,782 A | 9/2000 | Wolczko et al. | |
| 6,148,309 A * | 11/2000 | Azagury et al. | 707/206 |
| 6,148,310 A * | 11/2000 | Azagury et al. | 707/206 |
| 6,161,185 A | 12/2000 | Guthrie et al. | |
| 6,173,294 B1 * | 1/2001 | Azagury et al. | 707/206 |
| 6,185,581 B1 * | 2/2001 | Garthwaite | 707/206 |
| 6,224,485 B1 | 5/2001 | Dickinson et al. | |
| 6,226,653 B1 | 5/2001 | Alpern et al. | |
| 6,230,320 B1 | 5/2001 | Gakumura | |
| 6,249,793 B1 | 6/2001 | Printezis et al. | |
| 6,280,327 B1 | 8/2001 | Leifer et al. | |
| 6,280,329 B1 | 8/2001 | Kondo et al. | |
| 6,298,441 B1 | 10/2001 | Handelman et al. | |
| 6,299,535 B1 | 10/2001 | Tanaka | |
| 6,308,185 B1 * | 10/2001 | Grarup et al. | 707/206 |
| 6,309,301 B1 | 10/2001 | Sano | |
| 6,312,336 B1 | 11/2001 | Handelman et al. | |
| 6,317,756 B1 | 11/2001 | Kolodner et al. | |
| 6,320,320 B1 | 11/2001 | Bailey, III et al. | |
| 6,393,430 B1 | 5/2002 | Van Ryzin | |
| 6,396,531 B1 | 5/2002 | Gerszberg et al. | |
| 6,464,585 B1 | 10/2002 | Miyamoto et al. | |
| 6,468,160 B2 | 10/2002 | Eliott | |
| 6,470,361 B1 | 10/2002 | Alpern et al. | |
| 6,490,599 B2 | 12/2002 | Kolodner et al. | |
| 6,502,111 B1 * | 12/2002 | Dussud | 707/206 |
| 6,510,440 B1 * | 1/2003 | Alpern et al. | 707/206 |
| 6,520,890 B2 | 2/2003 | Hsu | |
| 6,529,919 B1 * | 3/2003 | Agesen et al. | 707/206 |
| 6,535,269 B2 | 3/2003 | Sherman et al. | |
| 6,599,194 B1 | 7/2003 | Smith et al. | |
| 6,601,171 B1 | 7/2003 | Carter et al. | |
| 6,712,704 B2 | 3/2004 | Eliott | |
| 6,738,875 B1 | 5/2004 | Wang | |
| 6,769,989 B2 | 8/2004 | Smith et al. | |
| 6,829,686 B2 | 12/2004 | Mathiske et al. | |
| 6,845,347 B1 | 1/2005 | Yang et al. | |
| 6,845,437 B2 * | 1/2005 | Borman et al. | 711/173 |
| 6,928,460 B2 * | 8/2005 | Nagarajan et al. | 707/206 |
| 7,065,617 B2 | 6/2006 | Wang | |
| 2001/0004609 A1 | 6/2001 | Walker et al. | |
| 2002/0077177 A1 | 6/2002 | Elliott | |
| 2003/0008715 A1 | 1/2003 | Huber et al. | |
| 2004/0003014 A1 * | 1/2004 | Nagarajan et al. | 707/206 |
| 2004/0162137 A1 | 8/2004 | Eliot | |
| 2004/0187102 A1 | 9/2004 | Garthwaite | |
| 2004/0199742 A1 | 10/2004 | Wang | |

FOREIGN PATENT DOCUMENTS

| | | |
|---|---|---|
| EP | 0 809 214 A1 | 11/1997 |
| EP | 0 889 420 A2 | 1/1999 |
| EP | 0 998 966 A2 | 5/2000 |
| EP | 1 035 706 A2 | 9/2000 |
| EP | 1 126 425 A2 | 8/2001 |
| FR | 2 743 434 A1 | 7/1997 |
| WO | WO 98/48353 | 10/1998 |
| WO | WO 00/40027 A1 | 7/2000 |
| WO | WO 00/51036 | 8/2000 |
| WO | WO 01/05477 A2 | 1/2001 |
| WO | WO 01/08148 A1 | 2/2001 |
| WO | WO 01/84768 A1 | 11/2001 |

OTHER PUBLICATIONS

Jones et al., "Garbage Collection, Algorithms for Automatic Dynamic Memory Management", 1996, John Wiley & Sons, pp. 172-173.*

Tanenbaum, Andrew S., "Structured Computer Organization", 1984, Prentice-Hall, Inc., 2nd Edition, pp. 10-12.*

Kwon et al., "Java Garbage Collection for a Small Interative System", Journal of Korean Information Science Society, vol. 29, No. 11-12, pp. 957-965, Dec. 2002.

Ossia, et al., "A Parallel, Incremental and Concurrent GC for Servers", ACM Sigplan Notices, vol. 27, No. 5, pp. 129-140, May 2002.

Levanoni et al., "An On-the-Fly Reference Counting Garbage Collector for Java", ACM Sigplan Notices, vol. 36, No. 11, pp. 367-380, Nov. 2001.

Srisa-an, et al., "Object Resizing and Reclamation Through the Use of Hardware Bit-Maps", Microprocessors and Microsystems, vol. 25, No. 9-10, pp. 459-467, Jan. 2002.

Chang, et al., "DMMX: Dynamic Memory Management Extensions", Journal of Systems and Software, vol. 63, No. 3, pp. 187-199, Sep. 2002.

Wise, et al., "Research Demonstration of a Hardware Reference-Counting Heap", LISP and Symbolic Computation, vol. 10, No. 2, pp. 159-181, Jul. 1997.

Yang et al., "Java Virtual Memory Timing Probes: A Study of Object Life Span and Garbage Collection", Conference Proceedings of the IEEE International Performance, Computing and Communications, pp. 73-80, Apr. 2002.

"Xbox to Deliver Ultimate Console Gaming Experience," Mar. 10, 2000, 3 pages, San Jose, CA.

Bloomberg News, "U.S. version of PlayStation2 to have modem, hard drive," c/netNews.com, Apr. 14, 2000, 2 pages.

Gordon, C., "Interviews—John Gildred of Indrema on the L600," Planet GeForce, Oct. 19, 2000, 5 pages.

IGN.com, "What Is the 64DD?", IGN.com, Sep. 17, 1997, 5 pages.

IGN.com, "The 64DD: Nintendo's Disk Drive—Everything you ever wanted to know about the N64's first major add-on," IGN.com, Jan. 28, 1998, 4 pages.

IGN.com, "The 64DD Connection—Here's how the 64DD and the Nintendo 64 connect," IGN.com, Oct. 20, 1999, 4 pages.

IGN.com, "IGN64's Ultimate 64DD FAQ—Everything you ever wanted to know about the upcoming disk drive add-on," IGN.com, Dec. 15, 1999, 8 pages.

Fedor, J., Johnson, S., and Carver, B., "Links 386CD, Players Manual," Access Software Inc., Jan. 1, 1995, pp. 1-87.

Lehrbaum, R., "Linux fuels game console plus," ZDNet News, Jul. 6, 2000, 5 pages.

Takahashi, D., "Microsoft goes gaming (Product Development)," Electronic Business, May 2000, 2 pages.

Mowatt, T., "Indrema: Linux-Based Console," c/net News.com, Aug. 11, 2000, 2 pages.

"Metropolis Street Racer Review," DailyRadar.com, Nov. 13, 2005, 5 pages.

SEGA Enterprises, Ltd., "Metropolis Street Racer," User Manual, 2000, 18 pages.

Jones and Lins, "Generational Garbage Collection," Inter-Generational Pointers, pp. 171-173.

Quinlan, D., "Filesystem Hierarchy Standard—Version 2.0", Online Oct. 26, 1997, pp. 1-ii, Retrieved from URL:http://www.lisoleg.net/lisoleg/fs/fhs.pdf, retrieved Nov. 18, 2004.

Sherman, S.A. et al., "Secure Network Access Using Multiple Applications of AT&T's Smart Card," AT&T Technical Journal, American Telephone and Telegraph Co. New York, US, vol. 73, No. 5, Sep. 1, 1994, pp. 61-72, XP000475912 ISSN: 8756-2324.

"CES: Bill Gates zeigt die Xbox" Golem.de 'Online! Jan. 6, 2000 Retrieved from the internet: url: http://dyn1.golem.de/cgi-bin/usisapi.dll/forprint??id11561> retrieved Jun. 18, 2004.

"DFU Verigindung herstellen" FAQ, 'Online! XPOO2318226 Retrived from the Internet: URL: www.puretec.de>'retrived on 2000!, 1 page.

"PlayStation 2 Instruction Manual," 'Online! 2000 Sony Computer Entertainment Retrieved from the Internet: url:www.playstation.com. retrieved on Jun. 18, 2004.

"PS2 Frequently Asked Questions," All Playstation2 'Online!, Jul. 29, 2000, Retrieved from the Internet: URL:http://www.allps2.net/ps2_faq.html> retrieved on Jun. 18, 2004.

"Dex Drive Manual" gameshark, Online! 1998, pp. 1-15, Retrieved from URL:http://www.angelfire.com/games/winospsxdexdrive/dexdrive.pdf.

Suarez, G., "Sony PlayStation 2," The Digital Bits 'Online!, Nov. 15, 2000, retrieved from the internet: URL:http://www.thedigitalbits.com/reviews/ps2/sonyps2*.html> retrieved on Jun. 18, 2004.

Perenson, M., "Play Back Media Your Way," PC World 'Online!, Jun. 1, 2000, Retrieved form the Internet: url:http://www.pcworld.com/resource/printable/0aid1700100.asp. retrieved on Jul. 8, 2004.

Thurrott, P., "Windows Media Player 7 reviewed," Winsupersite 'Onlilne!, Aug. 15, 2000, Retrieved formt he internet: URL:http://www.winsupersite.com/reviews/wmp7.asp> retrieved on Jun. 18, 2004.

Stallings, W., "Cryptography and Network Security: Principles and Practice," Second Edition Prentice Hall 1999; pp. 330 and 333-338.

A. Hosking, J. Moss, and D. Stefanovic, "A Comparative Performance Evaluation of Write Barrier Implementations," Proceedings ACM Conference on Object-Oriented Programming Systems, Languages, & Applications, Oct. 1992, pp. 92-109, Vancouver, Canada.

A. Hosking and R. Hudson, "Remembered sets can also play cards," OOPSLA '93, Workshop on Garabage Collection and Memory Management, Sep. 1983, 8 pgs, Washington D.C.

C. Flood. D. Detlefs, N. Shavit, and X. Zhang, "Parallel Garbage Collection for Shared Memory Multiprocessor," USENIX Java Virtual Machine Research & Technology Symposium, Apr. 23-24, 2001, 10 pgs. California, USA.

P. Wilson and T. Moher, "A 'Card-Marking' Scheme for Controlling Intergenerational References in Generation-Based Garabage Collection on Stock Hardware," ACM SIGPLAN Notices, May 1989, pp. 87-92, vol. 24, Issue 5.

A Comparison of Inferno and Java, Computing Sciences Research of Bell Labs, <<http://www.lucent-inferno.com/Page...tion/White_Paper/infernojava.html>>, Jul. 12, 1999.

Agesen, et al., Garbage Collection and Local Variable Type Precision and Liveness in Java Virtual Machine, ACM Sigplan Notices, vol. 33, No. 5, pp. 269-279, May 1998.

Atkinson, et al., Experiences Creating a Portable Cedar, Proceedings of the Sigplan 1989 Conference on Programming Language Design and Implementation, Sigplan Notices, vol. 24, No. 7, pp. 322-329, Jun. 21-23, 1989.

Aubrey, Lucent's Inferno: A Devil of an OS, Communications Week, No. 633, Oct. 14, 1996.

Bak, et al., The New Corp of Java Virtual Machines, ACM Sigplan Notices, vol. 33, No. 10, pp. 179-182, Oct. 1998.

Barrett, et al., Garbage Collection using a Dynamic Threatening Boundary, ACM Sigplan Notices, vol. 30, No. 6, pp. 301-314, 1995.

Benett, The Design and Implementation of Distributed Smalltalk, Proceedings of the Second ACM Conference on Object Oriented Programming Systems, Langagues and Applications, pp. 318-330, Oct. 4-5, 1997.

Birrell, et al., Network Objects, Software Practice and Experience, vol. 25, No. S4, pp. S4/87-S4/130, Dec. 1995.

Blue—What is it, <<http://www.sd.monash.edu.au/blue/what-is-it.html>>, printed Jul. 9, 1999.

Boehm, et al., Garbage Collection in an Incooperative Environment, Software—Practice and Experience, vol. 18, No, 9, pp. 807-820, Sep. 1988.

Boszormenyi, A Comparison of Modula-3 and Oberon-2 (extended version), Structured Programming, vol. 14, pp. 15-22, 1993.

Brandis, et al., The Oberon System Family, Institute for Computersystem, pp. 1331-1366, Apr. 25, 1995.

Cahill, et al., Interfacing a Language to the Virtual Machine, The Commandos Distributed Application Platform, Springer-Verlag, pp. 209-233, 1993.

Cardelli, et al., Modula-3 Report (revised), SRC Research Report 52, Preface, Nov. 1, 1989, <<http://gatekeeper.dec.com/pub/DEC...-reports/abstracts/src-rr-052.html>>, Jun. 1, 1999.

Cardelli, et al., the Modula-3 Type System, Conference Record of the 16th Annual ACM Symposium on Principals of Programming Language, pp. 202-212, 1989.

Caudill, et al., A Third Generation Smalltalk-80 Implementation, ACM Sigplan 1986 Conference on Object Oriented Programming Systems, Languages and Applications (OOPSLA 1986), pp. 119-129, 1986.

Chambers, et al., Object-Oriented Programming: Systems, Languages and Applications OOPSLA 1989, Conference Proceedings Sigplan Notices, vol. 24, No. 10, pp. 49-70, Oct. 1-6, 1989.

Clark, et al., The UCSD Pascal Handbook: A Reference and Guidebook for Programmers, CHVIII, IX, X, pp. 153-172, 1982.

Cmm and Java Compared: A Comparison of Modern Languages for the Internet and Worldwide Web, 1997, <<http://nombas.com/us/otherdoc/javavcmm.html>>, printed Jul. 12, 1999.

Deutsch, et al., An Efficient, Incremental, Automatic Garbage Collector, Communications of the ACM, vol. 19, No. 9, pp. 522-526, Sep. 1976.

Diwan, et al., Complier Support for Garbage Collection in a Statistically Typed Language, ACM Sigplan Notices, vol. 27, No. 7, pp. 273-282, 1992.

Diwan, Understanding and Improving the Performance of Modern Programming Languages, Department of Computer Science, University of Massachusetts (Amherst), pp. 1-137, Feb. 1997.

Doligez, et al., A Concurrent Generational Garbage Collector for Multithreaded Implementation of ML, Papers of the 20th ACM Symposium of Prinicipals of Programming Languages, pp. 113-123, Jan. 10-13, 1989.

Domel, Molbile Telescript Agents and the Web, Compcon 1996, Technologies for the Information Superhighway Digest of Papers, pp. 52-57, 1996.

Doward, et al., Inferno, Proceedings IEEE Compcon 1997, pp. 241-244, Feb. 23-26, 1997.

Doward, et al., Programming in Limbo, Compcon 1997 Proceedings of IEEE Conference, pp. 245-250, 1997.

Elements of Comparison Java/Hotjava vs. Caml/MMM, <<http://pauillac.inria.fr/~rouaix/mmm/currentjavacomp.html>>, printed May 28, 1999.

Evans, et al., Garbage Collection and Memory Management, OOPSLA 1997, Addendum to the 1997 ACM SIGPLAN Conference on Object Oriented Programming, Systems, Languages, and Applications, pp. 138-143, 1997.

Figueiredo, et al., The Design and Implementation of a Language for Extending Applications, Proceedings of XXI Brazilian Seminar on Software and Hardware, pp. 273-283, 1994.

The Oberon Home Page, Institute for Computersystem, Jul. 5, 1999, <<http://www.oberon.ethz.ch/oberon.html>>, printed Jul. 7, 1997.

Floyd, Comparing Object Oriented Languages, Dr. Dobb's Journal, vol. 18, No. 11, pp. 104-105, 118, Oct. 1993.

Franz, et al., Introducing Juice, Oct. 30, 1996, <<http://caesar.ics.uci.edu/juice/intro/html>>, printed Jul. 7, 1999.

Garbage Collection for ISC Eifeel: An Overview, ISE Technical Report, TR-EI-56/GC, Version 3.3.9, <<http://eiffel.com/doc/manuals/technology/internal/gc/page.html>>, Jul. 30, 1999.

Gosling, et al., The Java Language Environment: White Paper, pp. 12-16, 70-73, May 1996.

Gosling, et al., The NeWS Book: An Introduction to the Network/Extensible Window System, pp. 109-112, 147-161, 1989.

Gosling, SunDew: A Distrubted and Extensible Window System, Proceedings of the 1996 Winter Usenix Technical Conference, pp. 98-103, 1996.

Griswold, The Macro Implementation of SNOBOL4: A Case Study of Machine-Independent Software Development, Ch 4, pp. 51-55, Ch 5 pp. 56, Ch 6, pp. 65-78, Ch 7, pp. 79-95, Ch 9, pp. 142-155, 1972.
Haddon, et al., Experience with the Universal Intermediate Language Janus, Software-Practice and Experience, vol. 8, No. 5, pp. 601-616, May 3, 1978.
Harbison, Modula-3, Byte, vol. 15, No. 12, pp. 385-392, Nov. 1990.
Harbison, The Modula-3 Programming Language, Dr. Dobb's Journal, vol. 19, No. 12, pp. 24-30, Winter 1994.
Henderson, et al., A Comparison of Object-Oreinted Programming in Four Modern Languages, Software-Practice and Experience, vol. 24, No. 11, pp. 1078-1095, Jun. 20, 1994.
Henrique, et al., Lau: An Extensible Embedded Language, Dr. Dobb's Journal, vol. 21, No. 12, pp. 26-28, 32-33, 88, 90, Dec. 1996.
Holzle, Adaptive Organization for SELF: Reconciling High Performance with Exploratory Programming, Department of Computer Science, Stanford University, Aug. 1994.
Howard, A Quick Overview (Eiffel), Journal of Object Oriented Programming, vol. 5, No. 8, pp. 76-78, Jan. 1993.
Hudson, et al., A Language Independent Garbage Collector Toolkit, University of Massachusetts at Amherst, Department of Computer and Information Science, Technical Report, pp. 1-23, Sep. 1998.
Hudson, et al., Adaptive Garbage Collection for Modula-3 and Smalltalk, OOPSLA/ECOOP 1990 Workshop on Garbage Collection in Object-Oriented Systems, pp. 1-5, Oct. 27, 1990.
Huelsbergen, et al., Very Concurrent Mark & Sweep Garbage Collection without Fine Grain Synchronization, ACM Sigplan Notices, vol. 34, No. 3, pp. 166-175, 1998.
Hugunin, Python and Java: The Best of Both Worlds, Proceedings of the 6th Annual Python Conference, 1997, <<http://www.python.org/workshops/1997-10/proceedings/hugunin.html>>, Aug. 11, 1999.
Jordan, An Extensible Programming Environment for Modula-3, SIGSOFT Software Engineering Notes, vol. 15, No. 6, pp. 66-76, 1990.
Jul, et al., Fine Grained Mobility in the Emerald System, ACM Transactions in Computer Systems, vol. 6, No. 1, pp. 109-133, Feb. 1988.
Kolling, et al., Blue—A Language for Teaching Object-Oriented Programming, Proc. 27th SIGSCE Technical Symposium on Computer Science Education, pp. 190-194, Mar. 1996.
Kolling, et al., Requirements for a First Year Object-Oriented Teaching Language, SIGSCE Bulletin, 27 (I), pp. 173-177, Mar. 1995.
Lampson, A Description of the Cedar Language: A Cedar Language Reference Manual, Xerox Corp, Palo Alto Research Center, CSL-83-15, pp. 2-32, Dec. 1983.
Lim, et al., A Memory Efficient Real-Time Non-Coping Garbage Collector, ACM Sigplan Notices, vol. 34, No. 3, pp. 118-129, 1998.
Lucent Technologies, What is Inferno?, Inferno User's Guide, Dec. 19, 1997, pp. 1.1-1.12, USA.
Marais, et al., An Overview of Oberon, Institute for Computersysteme, May 8, 1996, <<http://www.ics.uci.edu/~oberon/intro.html>>, Jul. 7, 1999.
Milos, et al., Direct Implementation of Compiler Specifications of the Pascal P-Code Compiler Revisited, Conference Record of the 11th Annual ACM Symposium on Principals of Programming Languages, pp. 196-207, Jan. 15-18, 1984.
Moon, Garbage Collection in a Large Lisp Systems, Conference Record of the 1984 Symposium on LISP and Functional Programming, pp. 235-246, 1984.
Mossenbock, et al., The Programming Language Oberon-2, Institute for Computersysteme, Report 156, pp. 1-26, Mar. 1991.
Murer, et al., Iteration Abstracter in Sather, ACM on Programming Languages and Systems, vol. 23, No. 1, pp. 1-15, Jan. 1996.
Nettles, et al., Real-Time Replication Garbage Collection, ACM Sigplan Notices, vol. 23, No. 6, pp. 217-226, 1993.
O'Toole, et al., Concurrent Replicating Garbage Collection, ACM Sigplan Lisp Pointers, vol. VII, No. 3, pp. 34-42, 1994.
Oberson System 3 White Paper, Institute for Computersysteme (Feb. 11, 1999), http://www.oberon.ethz.ch/oberon/system3/white.html>>, printed Jul. 8, 1999.
Object Oriented Language: A Comparison, <<http://eiffel.com/doc/manuals/technology/oo_comparison/page.html>>, Jul. 12, 1999.
Oritz, The Battle Over Real-Time Java, Computer, pp. 13-15, Jun. 1999.
Remy, et al., Objective Calm—A General Purpose High-Level Programming Language, ERCIM News, No. 36, <<http://calm.inria.fr/ercim.html>>, Jun. 1, 1999.
Robinson, Modula-3 in an Undergraduate Computer Science Course, The Second International Modula-2, Conference: Modula-2 and Beyond, pp. 154-163, Sep. 11-13, 1991.
Romer, et al., The Structure and Performance of Interpreters, ACM SIGOOPS Operating Systems Review, vol. 30, No. 5, pp. 150-159, 1996.
Rook, A Language Collector Comments on: Java, Perl & Python, Oct. 1997, <<http://www.chips.navy.mil/chips/archives/97_oct/file12.html>>, Jul. 12, 1999.
Schmidt, et al., CLOS, Eiffel and Sather: A Comparison, International Computer Science Institute, Technical Report No. TR-91-047, pp. 1-24, Sep. 1991.
Shiffman, Making Sense of Java, <<http://www.disordered.org/Java-QA.html>>, Jul. 12, 1999.
Skulski, Oberon Resources for Linux, Jun. 1998, <<http://linux.nsrochster.edu/~skulski/LinuxOberon.html>>, Jul. 8, 1999.
Smith, et al., Comparing Mostly-Coping and Mark-Sweep Conservative Collection, ACM Sigplan Notices, vol. 34, No. 3, pp. 68-78, 1998.
Standard ML, <<http://cm.bell-labs.com/cm/cs/what/smlnj.html>>, Jun. 1, 1999.
Tardo, et al., Mobile Agent and Telescript, IEEE Compcon, pp. 58-63, 1996.
Templ, Oberon vs. C++, The Modula Tor: Oberon-2 and Modula-2 Technical Publication, No. 9, Oct. 1994, <<http://www.modulaware.com/mdlt49.ht,l>>, printed Jul. 7, 1999.
Thorn, Programming Languages for Mobile Code, ACM Computing Surveys, vol. 29, No. 3, pp. 214-239, Sep. 1997.
van Rossum, An Introduction to Python, pp. 1-4, Aug. 1997, <<http://www.python.org/doc/summary.html>>, printed Jun. 2, 1999.
van Rossum, Extending and Embedding the Python Interpreter, Corporation for National Research Initiatives CNRI, Release No. 1.5.2, Jul. 1999, <<http://www.python.org/doc/ext/intro.html>>, printed Aug. 11, 1999.
Waddington, et al., Java: Virtual Machine for Virtually any Platform, Embedded Systems Programming, vol. 9, No. 6, pp. 26-42, Jun. 1996.
Waldo, Programming with Java, Unix Review, vol. 14, No. 5, pp. 31-37, May 1996.
Walton, R-Code a Very Capable Virtual Computer, Harvard University, Center for Research Computing Technologies, Technical Report No. TR-37-95, pp. 1-187, Oct. 1997.
Watters, The What, Why, Who and Where of Python, Jan. 25, 1997, <<http://www.netowkrcomputing.com/unixworld/tutorial/005/005.html>>, printed May 28, 1999.
Weis, What is Caml, Jan. 1996, <<http://calm.inria.fr/FAQ/general-eng.html>>, printed Jun. 1, 1999.
Weiser, et al., The Portable Common Runtime Approach to Interoperability, Operating Systems Reviews Proceedings of the 12th ACM Symposium on Operating System Principals, vol. 23, No. 5, pp. 114-122, Dec. 3-6, 1989.
What is Python, <<http://www.pyton.org/doc/summary.html>>, printed Jun. 2, 1999.
Wiener, Watch Your Language, IEEE Software, vol. 15, No. 3, pp. 55-56, May/Jun. 1998.
Wilder, Introduction to Eiffel, Linux Journal, vol. 14, pp. 34-39, 56, and 60, Jun. 1995.
Wilson, Uniprocessor Garbage Collection Techniques, Proceedings of the 1992 Workshop on Memory Management, pp. 1-34, 1992.
Youmans, Java: Cornerstone of the Global Network Enterprise?, Virginia Tech, CS 3604, Feb. 7, 1997, <<http: ei.cs.vt.edu/~history/Youmans.Java.html>, Jul. 8, 1999.
Yurkoski, et al., Using Inferno to Execute Java on Small Devices, ACM Sigplan Workshop LCTES 1998, pp. 108-118, Jun. 19-20, 1998.

* cited by examiner

EPHEMERAL GARBAGE COLLECTION USING A TRACKING MECHANISM ON A CARD TABLE TO DETERMINE MARKED BUNDLES

TECHNICAL FIELD

This document generally relates to the management of memory in a computer system, and more particularly, to the management of memory in support of garbage collection.

BACKGROUND

Garbage collection, also commonly referred to as automatic memory management, attempts to automatically recycle dynamically allocated memory. Dynamically allocated memory is memory that is created at runtime and that is stored in an area of memory commonly referred to as the heap. There are several techniques that have been developed to perform garbage collection.

One technique is full garbage collection. During full garbage collection, the entire heap is analyzed to determine which memory to recycle. A disadvantage with this technique is that as the heap becomes larger and larger, garbage collection causes a significant delay to programs that are executing. This delay prohibits utilizing full garbage collection when the heap becomes too large.

Another type of garbage collection, commonly referred to as an incremental, generational, or ephemeral garbage collection, attempts to overcome this execution delay by dividing the heap into two or more generations. Newly created objects are allocated in the "youngest" generation. Ephemeral garbage collection then analyzes the "youngest" generation frequently in order to collect and recycle these objects. The older generations are analyzed less frequently, and, when recycled, all of the objects in the older generation are recycled together. Objects in the "youngest" generation that survive a certain number of collections may be "promoted" to the next older generation. Because the ephemeral garbage collection is typically performed on a small portion of the entire heap, ephemeral garbage collection does not impact the execution of programs in a significant manner.

However, even though ephemeral garbage collection does not directly impact the execution of programs in a significant manner, it does cause other problems. One problem occurs when older generations contain pointers that reference younger generations. Without scanning all the older generations, objects in the younger generation may be erroneously recycled. However, if all the generations are scanned, then the benefits of having multiple generations disappear. Fortunately, techniques have been developed to overcome this problem.

One technique, commonly referred to as card marking, divides the heap into cards of equal size. The size of the card may vary, but it is typically bigger than a word and smaller than a page. There are various acceptable methods of marking objects. For example, a single bit within a card bitmap can be changed to indicate when the memory associated with the card has been "touched" or accessed (e.g., written to). Thus, when performing ephemeral garbage collection, the objects in the youngest generation and the objects in each of the cards in the older generations that are indicated as being written into are analyzed. The term "written card" is used through-out this document to refer to a card that contains memory locations that have been "touched". While card marking greatly reduces the amount of heap that is analyzed during garbage collection, the efficiency of card marking is dependent on the size of the heap. For example, if the card size becomes too large, the cost of analyzing each of the objects in each of the marked cards becomes prohibitive. On the other hand, if the card size is too small and there are numerous cards, the overhead of having so many cards becomes prohibitive. Thus, the benefit of ephemeral garbage collection employing card marking also decreases as the size of the heap increases.

Recently, a new technique has emerged that helps minimize the dependency of ephemeral garbage collection on the heap size. This new technique implements a hierarchy of bundles where each bundle is associated with multiple cards. A bundle bit map is employed where each bit represents one of the bundles. During garbage collection, the bundle bit map is checked to determine which bundles have objects that have been accessed. If the bundle bit map indicates that an object within the bundle has been accessed, each card in that bundle is checked to see if it has been accessed. If it has, then each of its objects is checked. While this technique improves the efficiency of the ephemeral garbage collection, the cost of executing the program is doubled. For example, turning to FIG. 1, pseudo-code 100 illustrating a portion of helper code 102 called by a compiler is shown. The helper code 102 is called whenever a store operation (e.g., "=" operator) is encountered in the program that is being executed. A first statement 104 performs the necessary work of storing a value into the location specified in the program. The second statement 106 performs overhead for marking the card associated with the location, assuming the location is not in the "youngest" generation. The third statement 108 performs overhead for marking the bundle associated with the location. Therefore, the addition of statement 106 to perform bundling doubles the overhead for executing the store operator 104 in comparison to only performing card-marking (statement 106). Because programs typically contains several store operations, which are commonly within a loop, this doubling of execution for each store operation becomes unacceptable and implementing bundles becomes prohibitive.

Thus, until now, there has not been a satisfactory solution for ephemeral garbage collection of a large heap.

SUMMARY

The techniques and mechanisms described herein are directed to a system for performing garbage collection on a large heap. The heap is divided into cards, which are grouped into bundles. Briefly stated, the techniques include initiating a write-watch mechanism to track accesses to specified cards. The write-watch mechanism provides a list of the written cards to a garbage collection process which determines marked (accessed) bundles based on the list. For each marked bundle, the marked cards within the marked bundle are scanned to identify the accessed objects. The accessed objects are then collected. Because determining the marked bundles is performed at the start of the garbage collection process and not whenever the cards within the bundle are accessed, the present technique reduces the overhead associated with bundle marking and allows the efficiency of the garbage collection process to be less dependent on heap size.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Briefly, the present system and method minimize the overhead required in implementing bundle and card marking in ephemeral garbage collection. This is achieved by utilizing a memory management feature known as "write-watch" that is responsible for tracking modifications to specified memory locations. The "write-watch" information is used by the ephemeral garbage collection process to determine which bundles in the older generations have objects that need to be collected. The "write-watch" mechanism tracks the first access to specified memory locations and does not track subsequent accesses to the specified memory locations. As will be described in detail below, the present ephemeral garbage collection process allows the program to execute more efficiently without adding unnecessary overhead. These and other advantages will become clear after reading the following detailed description.

Exemplary Operating Environment

Figure 2:
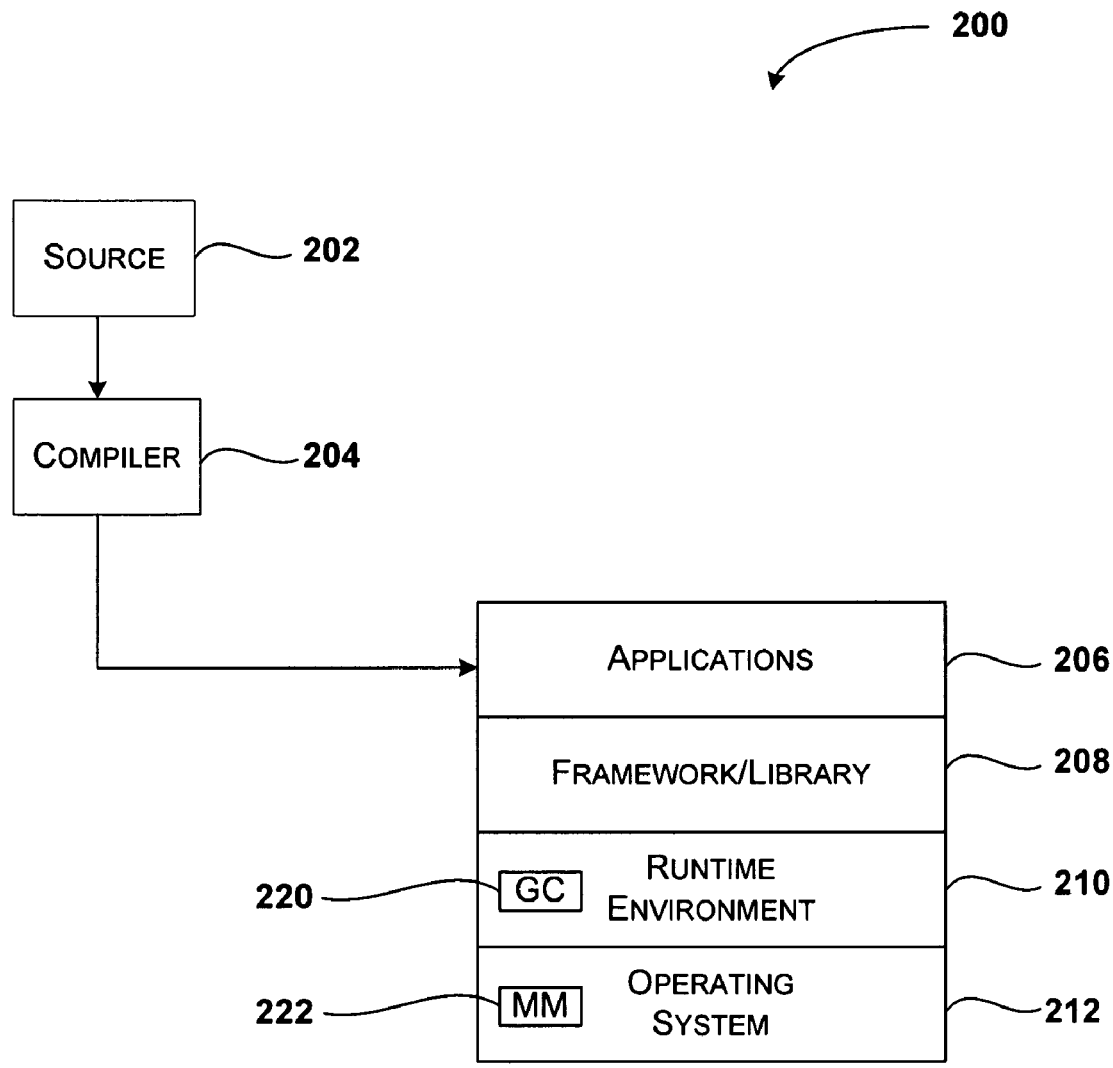
FIG. 2 is an illustrative operating environment suitable for implementing the techniques and mechanisms described herein.

FIG. 2 is an illustrative operating environment 200 suitable for implementing the techniques and mechanisms described herein. Operating environment 200 includes source 202 that is input into compiler 204. The source 202 may take several formats, but is typically a text-based file written in some language (e.g., C#, C++, Visual Basic, HTML). Compiler 204 compiles the source 202 to create application 206. Again, application 206 may take several forms, such as an executable that does not need further compilation or an assembly that may require additional compilation.

During runtime, application 206 is executed by utilizing framework 208, runtime environment 210, and operating system 212. Framework 208 may be a set of libraries or other services. Runtime environment is responsible for performing many services, such as encryption, security, Just-in-Time (JIT) compilation, and others. One service pertinent to the present technique is garbage collection 220. Briefly, garbage collection 220, described below in conjunction with the flow diagram in FIG. 6, performs ephemeral garbage collection. As will be described below, the ephemeral garbage collection 220 utilizes information obtained from a memory manager 222. As shown, memory manager 222 may be part of operating system 212. However, memory manager 222 may operate within runtime environment 210 or be its own application 206. In any implementation, memory manager 222 provides a "write-watch" mechanism that identifies the accessing of memory a first time without performing redundant identification of activities each time the memory is accessed. This "write-watch" mechanism may be performed using hardware, software, or a combination of both. Although any implementation of a "write-watch" mechanism may be used, the techniques described here have been used in conjunction with a "write-watch" mechanism which serves as the subject of U.S. patent application Ser. No. 09/628,708, entitled "EFFICIENT WRITE-WATCH MECHANISM USEFUL FOR GARBAGE COLLECTION IN A COMPUTER," filed on Jul. 31, 2000, and expressly incorporated herein by reference for all purposes.

Exemplary Computing Environment

Figure 3:
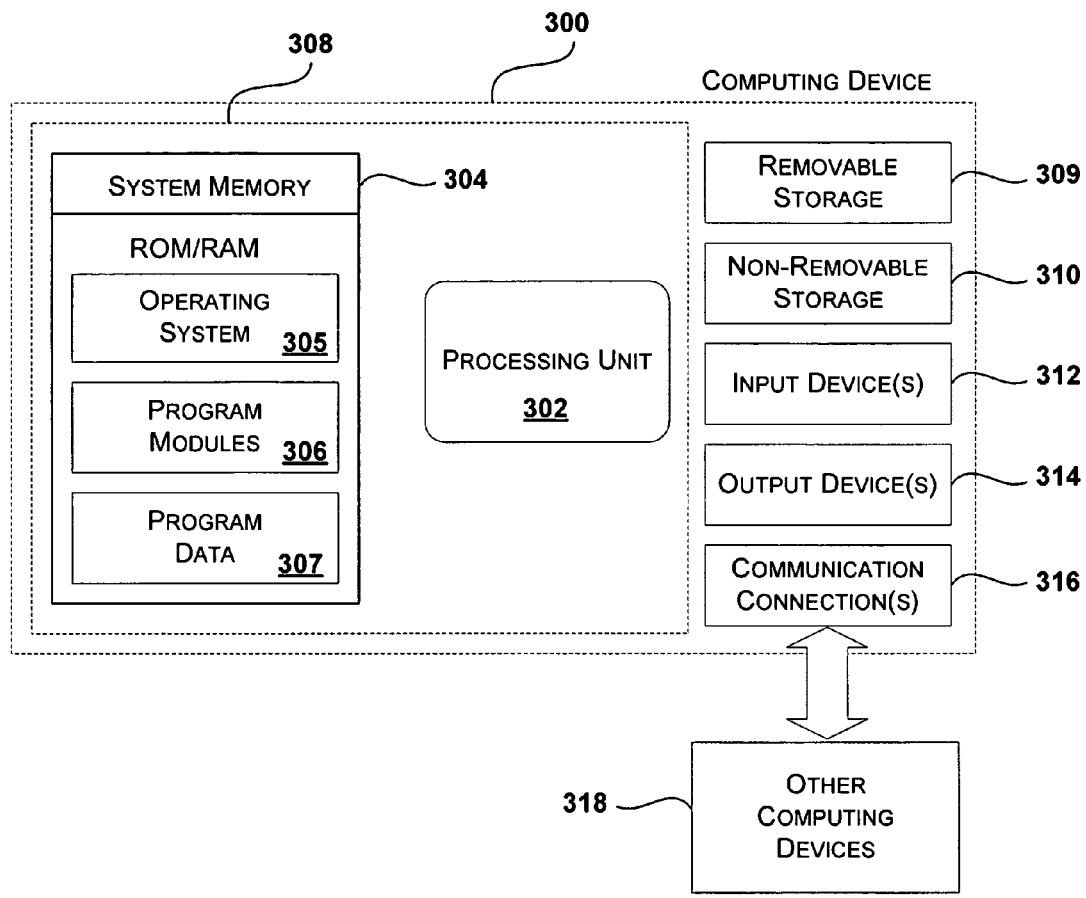
FIG. 3 is an illustrative computer environment that may be used to implement the techniques and mechanisms described herein.

The various embodiments of the present ephemeral garbage collection may be implemented in different computer environments. The computer environment shown in FIG. 3 is only one example of a computer environment and is not intended to suggest any limitation as to the scope of use or functionality of the computer and network architectures. Neither should the computer environment be interpreted as having any dependency or requirement relating to any one or combination of components illustrated in the example computer environment.

With reference to FIG. 3, one exemplary system for implementing the present ephemeral garbage collection includes a computing device, such as computing device 300. In a very basic configuration, computing device 300 typically includes at least one processing unit 302 and system memory 304. Depending on the exact configuration and type of computing device, system memory 304 may be volatile (such as RAM), non-volatile (such as ROM, flash memory, etc.) or some combination of the two. System memory 304 typically includes an operating system 305, one or more program modules 306, and may include program data 307. This basic configuration is illustrated in FIG. 3 by those components within dashed line 308.

Computing device 300 may have additional features or functionality. For example, computing device 300 may also include additional data storage devices (removable and/or non-removable) such as, for example, magnetic disks, optical disks, or tape. Such additional storage is illustrated in FIG. 3 by removable storage 309 and non-removable storage 310. Computer storage media may include volatile and nonvolatile, removable and non-removable media implemented in any method or technology for storage of information, such as computer readable instructions, data structures, program modules, or other data. System memory 304, removable storage 309 and non-removable storage 310 are all examples of computer storage media. Thus, computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 300. Any such computer storage media may be part of device 300. Computing device 300 may also have input device(s) 312 such as keyboard, mouse, pen, voice input device, touch input device, etc. Output device(s) 314 such as a display, speakers, printer, etc. may also be included. These devices are well know in the art and need not be discussed at length here.

Computing device 300 may also contain communication connections 316 that allow the device to communicate with other computing devices 318, such as over a network. Communication connection(s) 316 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

Figure 4:
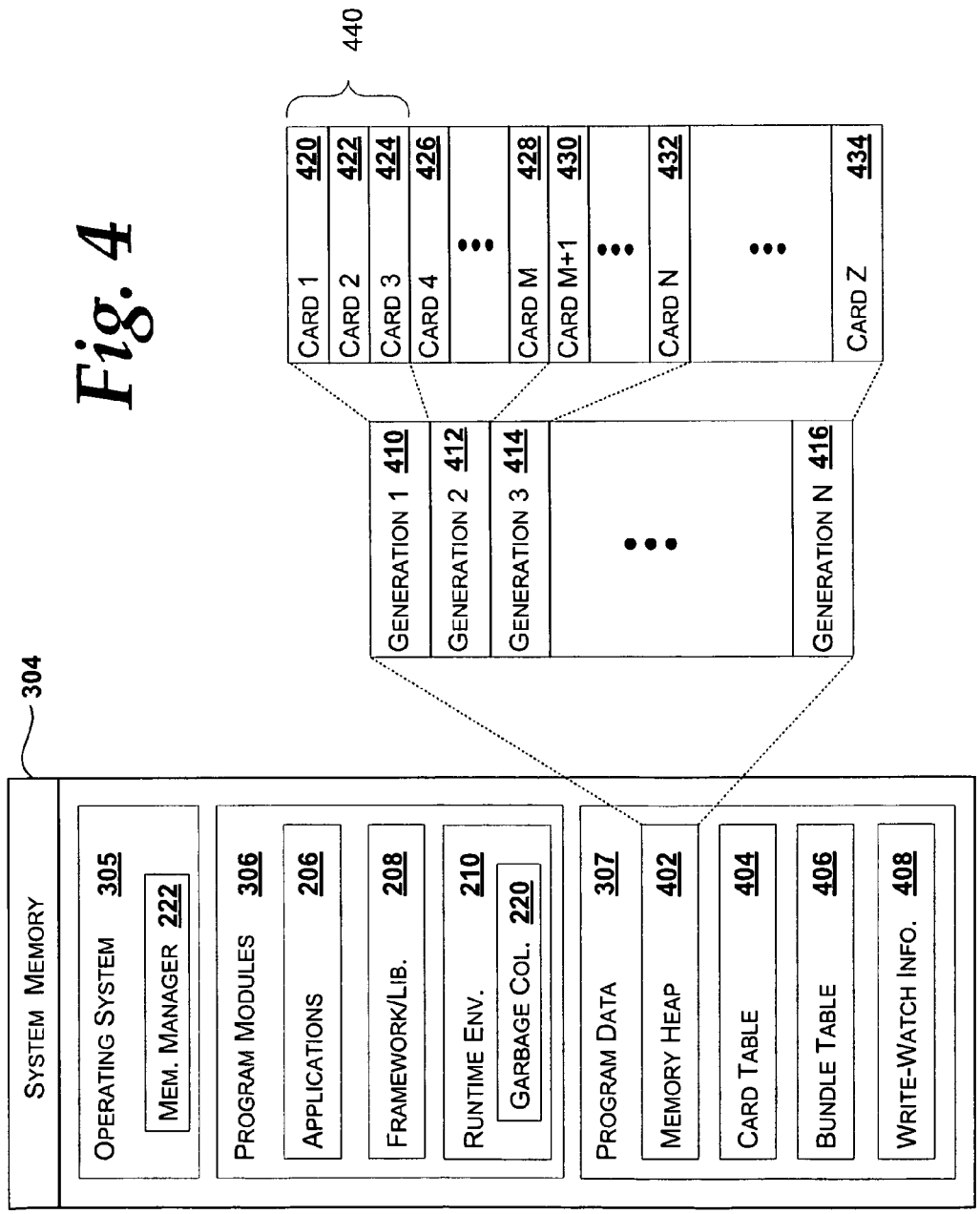
FIG. 4 is a block diagram that further illustrates aspects of the system memory shown in FIG. 3 for implementing the techniques and mechanisms described herein.

FIG. 4 is a block diagram that further illustrates aspects of the system memory 304 shown in FIG. 3 for implementing the techniques and mechanisms described herein. As illustrated in FIG. 3 above, the system memory 304 may include portions of operating system 305, program modules 306, and program data 307. The operating system 305 may include a memory manager 222 that implements a write-watch mechanism that supports the present ephemeral garbage collection process. Alternatively, the memory manager 222 may be included with runtime environment 210 or be its own application 206. The program modules 306 include each application 206 that is executing, framework 208, and runtime environment 210. As mentioned above, the runtime environment 210 provides additional services and may be a cross-platform run-time environment. One of the services provided by the runtime environment 210 that is of interest in the present discussion is garbage collector 220.

The garbage collector 222 is responsible for reclaiming memory from memory heap 402. The memory heap 402 includes memory allocated for static objects, global objects, local variables, pointers, and such for each application 206 that is executing or that has executed. In addition, the memory heap 402 includes objects allocated for the operating system and the runtime environment. Typically, the objects allocated for the operating system and the runtime environment are considered long-lived objects and are not necessarily collected during the ephemeral garbage collection.

In order to separate long-lived objects from the short-lived objects, the memory heap 402 is divided into one or more generations (e.g., generations 410-416). The size of each generation 410-416 is configurable and is, typically, a contiguous range of bytes in the system memory 304. However, the size of each generation may not be identical. For example, because the ephemeral generation (e.g., generation 410) contains short lived objects which are garbage collected more frequently, the ephemeral generation may be considerably smaller than older generations (e.g., generations 410-416), which hold long-lived objects. Each of the generations are further divided into a pre-determined number of cards (e.g., cards 420-434), where the card size is typically the same and range from a byte to a page in size. A pre-determined number of cards (e.g., 420-424) are grouped into a plurality of bundles (e.g., bundle 440). While FIG. 4, illustrates bundle 440 including each of the cards 420-424 within the first generation 410, each generation may have multiple bundles.

In order to aid in the ephemeral garbage collection process, the program data 307 also includes a card table 404. The card table identifies which cards in the generations 410-416 have an object that has been accessed (e.g., written to). When there are multiple generations (e.g., generations 412-416), there may be one card table for each generation or one card table may handle all the cards for all the generations. In one implementation, the card table may be a bit map having one bit for each card. The bit for each card indicates which cards are associated with an object that has been accessed. The bit may indicate this by being set or by being clear. In other implementation, multiple bits may be used to indicate the status of each card. As shown in FIG. 2 and explained above, during compilation of the program code, an overhead statement (e.g., statement 106) is performed to set/clear the card associated with the specified location (loc). While the pseudo-code illustrates one line of code to perform this operation, those skilled in the art appreciate that numerous operations must occur in order for this to be performed. For example, the location must be associated with a specific card, the corresponding bit map must be determined, a single bit within the bitmap must be written, and the like. All of these operations contribute to overhead associated with the store statement.

Figure 1:
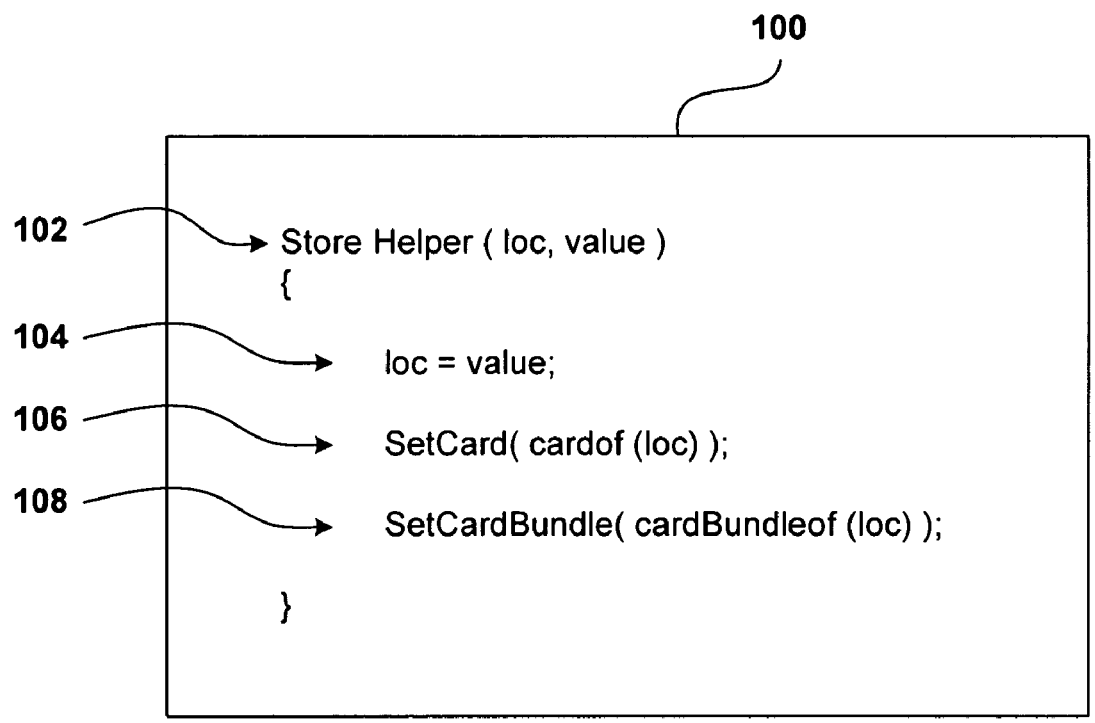
FIG. 1 is pseudo-code illustrating a prior technique of managing memory for garbage collection.

The program data 307 also includes a bundle table 406 and write-watch information 408. The write-watch information 408 contains information describing the cards that have been written to since the garbage collection process was last performed. The bundle table 406 maintains information for each bundle (e.g., bundle 440). There may be one bundle table for the entire heap, multiple bundle tables based on the number of generations, multiple bundle tables based on the heap size, or the like. In one implementation, the size of memory associated with each bundle is a page of card table memory. As will be explained later in conjunction with FIGS. 6 and 7, the bundle table 406 is updated when the ephemeral garbage collection process is executed. It is updated based on the write-watch information 408 that is maintained by the write-watch mechanism in the memory manager 222. In contrast with prior attempts with implementing bundles, the present ephemeral garbage collection does not introduce the doubling of overhead (e.g., statement 108 shown in FIG. 1) when maintaining the bundle table 406. Thus, the present ephemeral garbage collection process scales to accommodate large heap sizes without adversely impacting the execution time of programs.

Figure 5:
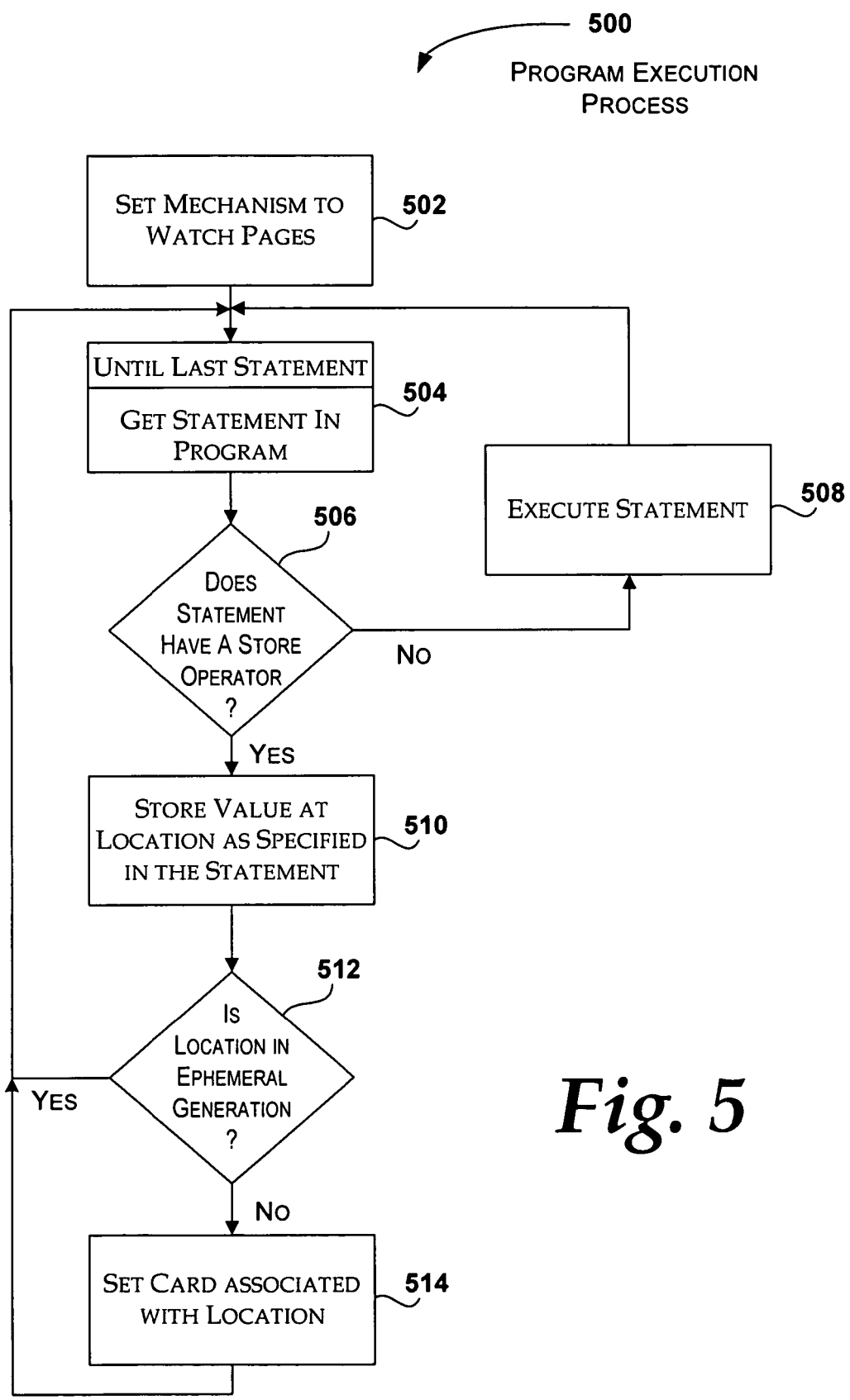
FIG. 5 is a flow diagram illustrating a portion of the execution process that utilizes memory management features that supports garbage collection.

FIG. 5 is a flow diagram illustrating a portion of a program execution process that supports the present ephemeral garbage collection. At block 502, a mechanism is set to watch the memory pages of interest. This may involve calling a function in the memory manager to enable the write-watch mechanism for the specified memory pages. For the present ephemeral garbage collection, the specified memory pages include the memory locations storing the card table 404 shown in FIG. 4. In one implementation, the garbage collection process may supply a range of memory addresses to the write-watch mechanism for the mechanism to track. In another implementation, when there are multiple card tables, the garbage collection process may call the write-watch mechanism to watch each card table independently. Alternatively, the garbage collection process may call the write-watch mechanism to watch any number or any portion of card tables(s). Once this mechanism is set, the execution of the program may proceed.

At block 504, each statement in the program is processed for execution. If the statement is executable code, the statements do not need additional compilation. However, if the program is an assembly, a JIT compiler may need to perform additional compilation on the statements before the statements are considered executable statements. Processing continues at decision block 506.

At decision block 506, a determination is made whether the statement includes a store operator, such as an equal ("="). If the statement does not have a store operator, the statement is executed at block 508 using processing known to those skilled in the art. Otherwise, processing continues at block 510.

At block 510, a value specified in the statement is stored at a location specified in the statement. Thus, the value is stored somewhere in the memory heap. Processing continues at decision block 512.

At decision block 512, a determination is made whether the location is within the ephemeral generation. Because locations within the ephemeral generation are already collected during the ephemeral garbage collection, additional processing is not necessary. If the location is within the ephemeral generation, processing continues to block 504 where the next statement is retrieved. Otherwise, processing continues at block 514.

At block 514, a card associated with the location is set. This may involve setting a bit in the card bitmap table associated with the location. As mentioned above, the processing performed in block 514 is considered overhead for executing the store operator. Thus, the execution of the program will incur a delay in execution. After the card is set (or cleared) in block 514, processing then continues to block 504 until each of the statements in the program have been processed.

Of interest, one will note that even though the present ephemeral garbage collection process utilizes both bundles and cards, the bundles are not set while processing each statement of the program. Thus, the additional overhead statement (e.g., statement 108 in FIG. 1) of setting the bundle table is eliminated. By eliminating the setting of the bundle table, the present ephemeral garbage collection process executes the program in nearly the same speed as when garbage collection utilizes only card marking. However, by utilizing the write-watch mechanism, the present ephemeral garbage collection process operates efficiently with any size of memory without being dependent on the memory size.

Figure 6:
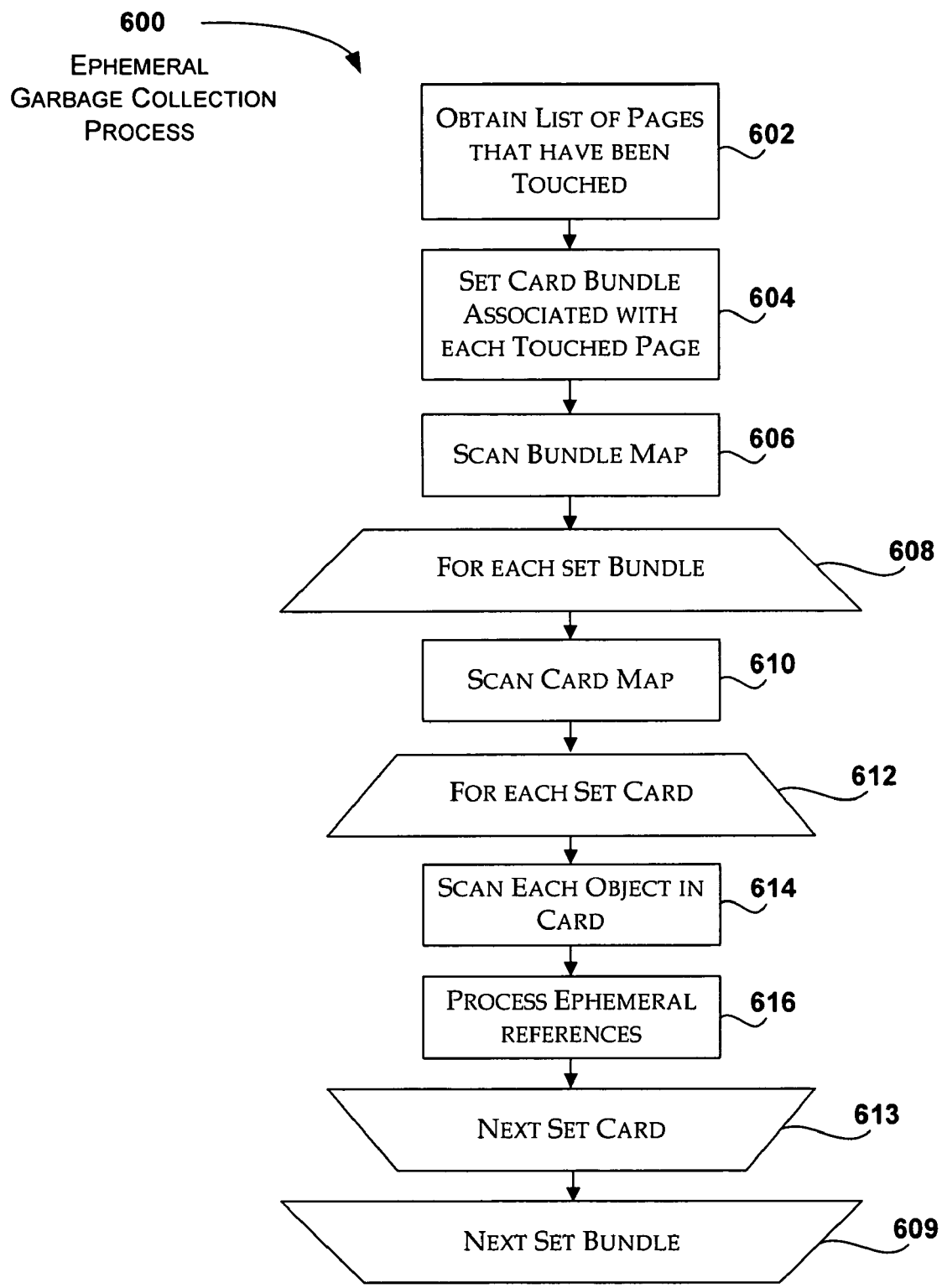
FIG. 6 is a flow diagram illustrating an ephemeral garbage collection process.

FIG. 6 is a flow diagram illustrating an ephemeral garbage collection process. The ephemeral garbage collection process may be initiated whenever additional memory is needed, upon a pre-determined interval, and the like. At block 602, a list of cards that have been accessed since the last garbage collection is obtained. This list is provided by the write-watch mechanism that is the subject of the afore-mentioned patent application. The present garbage collection process requests the list and stores the information that is returned from the write-watch mechanism in the write-watch information 408 shown in FIG. 4. As mentioned above, the ephemeral garbage collection process sets the write-watch mechanism to track accesses to the card table(s). By monitoring the card table(s), the write-watch mechanism conveniently identifies the cards having objects that have been accessed and returns the identified cards in the list. Processing continues at block 604.

At block 604, the bundle table is updated based on the write-watch information. The bundle table is updated by marking each bundle that has one of its cards identified within the list. Marking of the bundle table may be performed in various ways. One technique is to set or clear a bit in a bitmap, where each bit is associated with a particular bundle. As illustrated in FIG. 4, each bundle is associated with a pre-determined number of cards. In certain cases, the last bundle may have fewer cards than the previous bundles. In one implementation, the bundle may be the size of a page of card table memory. Processing continues at block 606.

At block 606, the bundle tables(s) are scanned to determine which bundles indicate that one of the cards associated with the bundle have been accessed. For each bundle that indicates that the bundle has been accessed, processing of "For" loop 608-609 is performed. Within "For" loop 608-609, at block 610, the card table is scanned to determine which cards in the bundle have been set. For any card in the bundle that is set, "For" loop 612-613 is performed.

In "For" loop 612-613, at block 614, each object in the card is scanned. The processing performed in block 614 may use conventional garbage collection processing utilized with card-marking. Once all the object have been identified in block 614, at block 616, the objects in the card that have been accessed may be collected in various manners that are known to those skilled in the art. For example, the accessed objects may be moved to the ephemeral generation or the like. Once each object in each card of each bundle that has been set has been processed, the ephemeral process 600 may reset the card table and the bundle table as needed.

Thus, as illustrated in FIG. 6, the present ephemeral garbage collection utilizes bundles without incurring the overhead of prior attempts. This allows the present ephemeral garbage collection to operate efficiently with any heap size, in particular, large heaps. For example, assuming a 4 Giga-byte (Gbyte) memory heap, in one implementation, the cards size may be set at 32 bytes. Because the size of the cards is relatively small, the time consumed for scanning the marked cards and looking for modified objects is not significant. For any cards that have modified objects, the card is marked by setting a bit within the card table. Therefore, each bit in the card table represents 32 bytes of memory heap. Assuming a page is 4096 bytes, there will be 128 cards per page of memory (4096/32=128). These 128 cards will each be represented by one bit in the card table, which correlates to 16 bytes (128 bits). The bundle may then be set to encompass an entire page of card table memory, which will include 4096*8 cards.

The 4 giga-byte memory heap may be divided into 1,048, 576 (i.e., 1M) worth of pages (4 Gbytes/4K). Thus, 128*1M cards covers the entire 4 Gbytes of memory heap. Thus, 16 Mbytes ((16 bytes/128 cards)*(128*1M cards)) of card table memory is utilized to cover the 4 Gbytes of memory heap. The write-watch mechanism may then be set to monitor the 16 Mbytes of card table memory, which effectively tracks the entire 4 Gbytes of memory.

By instructing the write-watch mechanism to track updates to the card table, the present ephemeral garbage collection process may utilize the existing code that performs the card-marking function for the garbage collection process without modifying or re-testing the code. In addition, the write-watch mechanism does not add additional costs to implement or adversely affect run-time performance for implementing bundles in the present ephemeral garbage collection process.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A computer-readable storage medium apparatus having computer-executable instructions encoded thereon to support ephemeral garbage collection by setting a write-watch mechanism to watch specified memory locations, the computer-readable storage medium apparatus being accessible by a computing device, the instructions, upon execution, causing the computing device, during execution of a program, when a statement of the program for execution is obtained, to determine whether the statement includes a store operator, the instructions, upon execution, further causing the computing device to perform operations comprising:
   during a loop that is performed for at least two iterations based at least on respective store operators:
   storing a value specified in the statement in a memory location specified in the statement;
   determining whether the memory location specified is within an ephemeral generation;
   in an event the memory location specified is within the ephemeral generation, obtaining a next statement of the program for execution; and
   in an event the memory location specified is not within the ephemeral generation, setting a card associated with the memory location specified and obtaining the next statement of the program for execution;
   requesting via the write-watch mechanism a list of memory locations, the list:
   identifying a plurality of the memory locations that have been accessed since a last ephemeral garbage collection process, each memory location corresponding to one of a plurality of cards associated with one or more objects allocated from within a memory heap, each of the plurality of cards associated with a card table, wherein the card table identifies one or more of the plurality of cards with objects that have been accessed; and
   comprising a bitmap, wherein each bit within the bitmap corresponds to one of the plurality of cards, modification of the bitmap occurring when a corresponding bit is set at the time that the card is trimmed to disk;
   creating, during the current ephemeral garbage collection process and responsive to exiting the loop upon encountering a statement lacking a store operator, a bundle table containing entries identifying a plurality of bundles, wherein each of the plurality of bundles identifies groupings of subsets of the plurality of cards;
   marking, outside of the loop including setting the card, during the current ephemeral garbage collection process, two or more of the plurality of bundles identified in the bundle table using the list, wherein the marked bundles identify groupings of subsets of the plurality of marked cards having associated objects that have been accessed since the last ephemeral garbage collection process; and
   performing garbage collection upon at least one accessed object.

2. The computer-readable storage medium apparatus of claim 1, wherein the write-watch mechanism operates within a memory manager.

3. The computer-readable storage medium apparatus of claim 1, wherein the write-watch mechanism records a first access to one of the plurality of memory locations.

4. The computer-readable storage medium apparatus of claim 1, wherein the write-watch mechanism maintains the list of memory locations in response to a request from the ephemeral garbage collection process.

5. The computer-readable storage medium apparatus of claim 1, the operations further comprising resetting the list of memory locations.

6. The computer-readable storage medium apparatus of claim 1, wherein the subset of cards corresponds to a number of cards that are tracked using a page of memory storing the card table.

7. The computer-readable storage medium apparatus of claim 1, wherein identifying the marked bundle comprises marking a bit associated with the marked bundle table within a bundle bitmap based on the memory locations within the list.

8. The computer-readable storage medium apparatus of claim 7, wherein marking the bit comprises setting the bit.

9. The computer-readable storage medium apparatus of claim 1, wherein determining the at least one marked card comprises scanning a card bitmap having a bit for each of the plurality of cards, the bit for each marked card being different than another bit of the card bitmap associated with one of the cards that was not accessed.

10. The computer-readable storage medium apparatus of claim 1, the operations further comprising using, by a current ephemeral garbage collection process, information from the write-watch mechanism to determine which bundles in older generations have objects for collection.

11. The computer-readable storage medium apparatus of claim 1, the operations further comprising:
   for each marked bundle identified in the bundle table, determining at least one marked card in a grouping of subsets of the plurality of marked cards identified by the marked bundle; and
   for each determined marked card, determining at least one accessed object associated with the marked card.

12. A method for executing statements within a program to support ephemeral garbage collection by setting a write-watch mechanism to watch specified memory locations such that during execution of a program, when a statement of the program for execution including a store operator is obtained, a computing device performs the method comprising:
   specifying a range of card table memory to watch during program execution by calling a write-watch mechanism that:
   performs tracking of access to the card table memory; and
   maintains a write-watch list that identifies cards marked within the card table memory since a garbage collection process was last performed, each card being associated with and updated upon access to one or more objects allocated within a memory heap, the memory heap being divided into a plurality of cards with each card being grouped into one of a plurality of bundles, wherein one of the plurality of bundles corresponds to a subset of that plurality of cards that are tracked using a page of card table memory outside of a loop that is traversed at least twice based on a respective number of store operators including marking at least one of the plurality of cards;

during the loop including marking at least one of the plurality of cards, in an event the statement obtained has one of the store operators:
  storing a value within the memory heap at a memory location specified by the statement obtained;
  determining whether the memory location specified is within an ephemeral generation;
  in an event the memory location specified is within the ephemeral generation, obtaining a next statement of the program for execution; and
  in an event the memory location specified is not within the ephemeral generation, marking the at least one of the plurality of cards within the card table memory corresponding to the memory location and obtaining a next statement of the program for execution.

13. The method of claim 12, wherein the tracking includes the write-watch mechanism that resides within a memory manager setting bits in the card table memory upon access to at least one of the plurality of cards.

14. The method of claim 12, further comprising an ephemeral garbage collection process that requests the write-watch list when performing garbage collection.

15. The method of claim 12, wherein an ephemeral garbage collection process determines a marked bundle based on the write-watch list.

16. The method of claim 12, wherein the write-watch mechanism sets bits in the card table memory upon access to at least one of the plurality of cards at the time that the card is trimmed to disk.

17. The method of claim 12, further comprising:
  determining whether calling the write-watch mechanism resets a write-watch state by inquiring which cards have changed without being considered as having asked and thereby resetting the state, and
  in an event the state is to be reset, placing a separate reset call to reset the range of card table memory without reporting whether the cards in the range have been marked.

18. The method of claim 12, further comprising:
  tracking access to the card table memory by the write-watch mechanism;
  creating, during an ephemeral garbage collection process, one or more bundle tables containing entries identifying groupings of the cards in the plurality of bundles, for each stored statement within the program, the ephemeral garbage collection process occurring after the program execution process;
  updating, during the ephemeral garbage collection process, at least one bundle table by marking the entries in the bundle table based on information obtained from the write-watch list, wherein the updated marked bundle table identifies groupings the plurality of marked cards having associated objects that have been accessed since a last garbage collection process;
  for each marked bundle table, determining during the ephemeral garbage collection process at least one marked card in a grouping of the plurality of marked cards identified by the marked bundle table;
  for each marked card, determining during the ephemeral garbage collection process, at least one accessed object associated with the marked card; and
  performing garbage collection during the ephemeral garbage collection process upon the at least one accessed object.

19. A memory management system that sets a write-watch mechanism to watch specified memory locations during execution of a program, obtain a statement of the program for execution, and determine whether the statement obtained includes a store operator, the system comprising:
  a processor;
  a memory into which a plurality of instructions are loaded and into which a plurality of objects are dynamically allocated, the memory having a heap into which the objects are allocated, the heap being divided into a plurality of cards which are grouped into a plurality of bundles, each card being associated with one or more of the plurality of objects, wherein upon execution of the plurality of instructions by the processor, the system, based at least on whether the store operator is included in the statement for execution obtained, performs an operation such that:
    in an event the statement obtained does not have a store operator, executing the statement; and
    in an event the statement obtained has a store operator performing at least two iterations of a loop including:
      storing a value specified in the statement obtained in a memory location specified in the statement obtained;
      determining whether the memory location specified is within an ephemeral generation;
      in an event the memory location specified is within the ephemeral generation, obtaining a next statement of the program for execution; and
      in an event the memory location specified is not within the ephemeral generation, setting a card associated with the memory location specified and obtaining the next statement of the program for execution; and
  the write-watch mechanism that identifies cards that have been set in the memory location specified since a garbage collection process was last performed, the plurality of cards being grouped into one of the plurality of bundles, and a corresponding bundle of the plurality of bundles that have been marked outside of the loop based at least on encountering a statement not having a store operator including setting the card.

20. The system of claim 19, wherein the write-watch mechanism resides within a memory manager and sets bits in a card table upon access to at least one of the plurality of cards.

21. The system of claim 19, wherein the system:
  requests a list from the write-watch mechanism, the list identifying memory locations that have been written into since a last garbage collection process, each memory location corresponding to one of the plurality of cards associated with a card table, wherein the card table identifies one or more cards that have been accessed, the card table and cards being marked to identify the one or more of the plurality of cards with the one or more objects that have been accessed, during execution of the program exclusive of an ephemeral garbage collection process;
  creates, during a current ephemeral garbage collection process, one or more bundle tables wherein each bundle table identifies groupings of the plurality of cards in the plurality of bundles;
  updates, during the current ephemeral garbage collection process, at least one bundle table by marking bundles within the bundle table based on the list, wherein the marked bundles corresponds to marked cards having associated objects that have been accessed since a last ephemeral garbage collection process;
  determines, during the current ephemeral garbage collection process, for each marked bundle within the bundle table, at least one marked card within the marked bundle, the at least one marked card indicating that one or more objects associated with the marked card have been accessed;

determines, during the current ephemeral garbage collection process, for each marked card, the one or more objects that have been accessed; and performs, during the current ephemeral garbage collection process, garbage collection upon the one or more accessed objects.

22. The system of claim 21, wherein the system sets a bit in the card table to identify one or more cards that have been accessed at the time a card that has been accessed is trimmed to disk.

23. The system of claim 19, wherein the system:

determines whether a request resets a write-watch state by inquiring which memory locations have changed without being considered as having asked and thereby resetting the state, and in an event the state is to be reset, the system places a separate reset request to reset a range of memory locations without reporting whether the memory locations in the range have been marked.

24. The system of claim 21, wherein the marked bundle is identified by a marked bit associated with the marked bundle within a bundle bitmap based on the list.

* * * * *